United States Patent [19]

Pray

[11] 3,948,825

[45] Apr. 6, 1976

[54] CURING AGENT FOR USE IN MAKING CELLULAR POLYURETHANE COMPOSITIONS

[75] Inventor: Edward R. Pray, Dearborn, Mich.

[73] Assignee: BASF Wyandotte Corporation, Wyandotte, Mich.

[22] Filed: July 5, 1974

[21] Appl. No.: 485,798

[52] U.S. Cl.......... 260/2.5 AQ; 252/182; 260/2 BP; 260/77.5 AQ, 260/573
[51] Int. Cl.² ............................................. C08G 18/32
[58] Field of Search .... 260/77.5 AQ, 2.5 AQ, 2 BP, 260/573; 252/182

[56] References Cited
UNITED STATES PATENTS

| | | | |
|---|---|---|---|
| 3,257,339 | 6/1966 | Hostettler et al. | 260/77.5 AQ |
| 3,264,268 | 8/1966 | Mullen et al. | 260/77.5 AQ |
| 3,423,344 | 1/1969 | Odinak et al. | 260/77.5 AQ |

Primary Examiner—M. J. Welsh
Attorney, Agent, or Firm—John W. Linkhauer; Bernhard R. Swick; Robert E. Dunn

[57] ABSTRACT

By reacting a proper proportion of an alkylene oxide with methylene dianiline (MDA), there is obtained a curing agent or cross-linking agent useful in place of methylene-bis-orthochloro aniline (MOCA) for making polyurethane foams. The invention provides a solution to the problem of finding a substitute for MOCA, which has become suspected as a carcinogen.

4 Claims, No Drawings

CURING AGENT FOR USE IN MAKING CELLULAR POLYURETHANE COMPOSITIONS

BACKGROUND OF THE INVENTION

1. Field of the Invention

This invention relates to the manufacture of cellular polyurethane plastics, i.e., polyurethane foams, and in particular, the invention relates to the making of a suitable curing agent or cross-linking agent for use in the making of such compositions.

2. Description of the Prior Art

It is known, for example, from U.S. Pat. No. 2,850,464, that in the making of polyurethane foams, it is often desirable to include in the composition a certain amount of a polyfunctional curing agent. In the early days of this art, the curing agent was usually a trifunctional or high alcohol, such as glycerol, pentaerythritol, sorbitol, or the like. As early as 1953, it was also appreciated that diamines could be used for this purpose. The above-mentioned patent mentions the possibility of using methylene dianiline (MDA) as the curing agent, but later experience with this compound has revealed that for most purposes, it is too reactive to be useful as a curing agent. When it is included in a polyurethane foam formulation, the curing time tends to be so short that it becomes impractical to make effective use of the composition, because the material hardens before the foam-forming reaction has taken place to a sufficient extent.

Previous efforts have been made to provide compounds similar to MDA but somewhat lower in reactivity. An example is U.S. Pat. No. 3,563,906, which teaches that MDA is unsatisfactory, and that it has been common to use in place of it other hindered or suitably substituted aromatic diamines, such as 2,2'-dichlorobenzidene or 4,4'-methylene-bis-(2-chloroaniline) (MOCA). The above-mentioned patent then goes on to teach the making of a composition containing MOCA and various other diamines, starting with a crude material resulting from the reduction of chloronitrobenzene.

Still more recently, it has developed that MOCA and compositions that contain it are considered of limited usefulness, because of the suspected cancer-producing properties of MOCA. Efforts have been made to find a satisfactory substitute for MOCA.

Both MDA, on the one hand, and the lower polyalkylene oxides, ethylene oxide and 1,2-propylene oxide, are well known as chemicals, and it has been known that MDA and other diamines will react with any of such polyalkylene oxides.

Polyurethane compositions have been made which contain, as a part thereof, a polymeric material made by reacting MDA with several mols of polyalkylene oxide. Polyurethane compositions frequently contain a polyol or polyester-polyol component that is used to react with a polyisocyanate material to make up the polymeric material that comprises the bulk of the composition. Such polyols are not, of course, useful as curing agents or cross-linking agents in the manufacture of cellular polyurethane compositions, as MOCA and compositions similar to it, or containing it, have customarily been.

The idea of reacting an aliphatic diamine, namely, ethylenediamine, with fewer than 4 moles of alkylene oxide, to obtain useful products, has been disclosed in U.S. Pats. Nos. 3,398,097; 3,398,198; 3,454,647; and 3,524,883.

SUMMARY OF THE INVENTION

According to the invention, in a limited aspect, about 0.7 to 2.5 mols of alkylene oxide such as propylene oxide or ethylene oxide are reacted with 1 mol of MDA to yield a curing-agent or cross-linking agent composition. Such composition is then used in the making of cellular polyurethane compositions in the same manner as a triol or MOCA. In a broader aspect, similar curing agents are made on the basis of other aromatic diamines, similarly reacted with modest amounts of alkylene oxide or, in some instances, relatively small amounts of other substances capable of reacting with the active hydrogen atoms of the diamine.

Depending upon the selected proportions of alkylene oxide and aromatic diamine, there may be prepared curing agents having a desired degree of activity, and in a usual case, a degree of activity substantially less than that of MDA, which reacts so rapidly as to be nearly useless as a curing or cross-linking agent in making polyurethane compositions.

DETAILED DESCRIPTION OF THE INVENTION

The compositions of the present invention are obtained by reacting a suitable aromatic diamine or other higher amine with a suitable proportion of alkylene oxide, alone or with other agents capable of reacting with active hydrogen atoms of the diamine or the like. By employing certain proportions of the ingredients, there are obtained products that exhibit little tendency to crystallize and have suitable viscosities and reactivities for use as curing agents or cross-linking agents for making urethane polymers. The compositions of the present invention are believed to be mixtures containing essentially the starting diamine and the product of its reaction with 1, 2, or 3 mols of alkylene oxide.

One manner of preparing a composition in accordance with the present invention is as follows.

EXAMPLE 1

To a two-liter four-neck round-bottom flask equipped with a Teflon-plated stirrer, a thermowell and a dry-ice condenser protected with a tube of desiccant, there were charged 396 grams (2.0 mols) of methylene dianiline. Then, 232 grams (4.0 mols) of propylene oxide were charged to a side-armed addition funnel. The contents of the flask were melted and heated to 150°C., and the addition of the oxide was made at 150°C. After the addition was completed, the reaction mixture was stirred for one hour at 150°C. The additions of propylene oxide were made over a period of about two hours. At about the time of the beginning of the additions of the propylene oxide, 1 drop of distilled water was added to the reaction flask.

Analysis of the product yielded the following data, the percentages being by weight:

Total titratable amino nitrogen, 8.87%.
Titratable tertiary amino nitrogen, 2.0%.
Weight % water, 0.05.

These results conform with those for a mixture of 22.4 weight percent of the 4,4 diadduct and the 77.6 weight percent of the 4,4' diadduct. The phenylisocyanate active hydrogen number was found to be approximately 555. This product was designated "MDA Polyol P314T".

EXAMPLE 2

Propylene oxide (348 grams, 6.0 mols) was added to methylene dianiline (1188 grams, 6.0 mols) and 3 drops of distilled water as catalyst, at 132° to 157°C. over a period of three hours and twenty minutes. The reaction mixture was then stirred an additional one hour and five minutes at 148° to 153°C. Data from analysis of the product revealed primary, secondary, and tertiary titratable amino nitrogen contents of 5.8, 4.4, and 0.7 weight percent, respectively, for a total of 10.9 weight percent of titratable amino nitrogen. The water content was 0.065 percent, and the phenylisocyanate active hydrogen number was approximately 570. This material was identified as "MDA Polyol P256T".

EXAMPLE 3

An adduct of 2 mols propylene oxide per one mol of methylene dianiline was prepared on a larger scale. To a prepared autoclave, there were charged 3168 grams (16 mols) of methylene dianiline and 1.0 grams of distilled water. The autoclave was sealed and then heated to 150°C. for one-half hour, and thereafter 1856 grams (32 mols) of propylene oxide were added over a period of eight to nine hours. The reaction was permitted to continue for one hour at 150°C., following which the contents of the autoclave were cooled to 70°C. and discharged. During the addition of the propylene oxide, the autoclave was operated at a pressure on the order of 10 to 20 pounds per square inch gauge. After the propylene oxide had been added, the pressure was increased to approximately 75 pounds per square inch gauge, remaining at that higher value until the autoclave was cooled to 70°C. and discharged.

The product so made was stripped for one hour at 105°C. and less than 10 millimeters of mercury absolute pressure, to determine the weight percent of volatiles present. The result of this determination was a calculated value of 0.083 weight percent of volatiles.

A Brookfield viscosity was also determined at 28.0°C., the value obtained being 5,880,000 centipoises.

The sample was also analyzed to determine the weight percents of titratable primary, secondary, and tertiary amino nitrogens, and values of 1.6, 5.1, and 1.4 weight percent respectively, were observed. The water content was 0.10 weight percent. The phenylisocyanate active hydrogen number was 565 milligrams of potassium hydroxide per gram.

This product was designated "MDA Polyol P314T".

In practicing the present invention, it is important to control the mol ratio of alkylene oxide to diamine. For example, in the case of compositions based upon MDA, it is certainly necessary to use enough of the alkylene oxide to react with the most of the amine's active hydrogen atoms to obtain a product that will react sufficiently slowly to be useful. This makes necessary the use of at least 0.5 or 0.7 mols of alkylene oxide per mol of diamine. The use of greater proportions of alkylene oxide will result in curing agents that have slower reaction times. It is desirable not to deprive the diamine of all or nearly all of its active hydrogen atoms. In general, it is undesirable to use more than about 2.5 mols of alkylene oxide per mol of diamine.

Satisfactory products have been made with the use of 1 mol or 2 mols of ethylene oxide or propylene oxide per mol of MDA.

With regard to the uses and the manner of using the curing agents or cross-linking agents of the present invention, reference is made to U.S. Pat. No. 3,563,906, which describes in some detail the various uses to which a curing agent or cross-linking agent may be put and the considerations that come into play in using same.

The invention will now be described with references to the following examples of specific embodiments thereof, wherein parts and percentages are by weight unless otherwise specified.

In accordance with the invention, a suitable aromatic diamine or other higher amine is used. Desirably, an unhalogenated (unchlorinated) diamine is used, to avoid any question of possible carcinogenic properties. It is desirable, moreover, to select a relatively inexpensive diamine. The diamines used as cross-linking agents in accordance with the prior art have been ones that are suitably hindered, by having substituents on their rings in positions ortho to the amino group; such diamines are relatively expensive to make. In contrast, MDA and m-phenylenediamine are relatively inexpensive. Other diamines that may be used are as follows:
 diaminonaphthalene,
 2,3-diaminotoluene,
 2,4-diaminotoluene,
 2,5-diaminotoluene,
 2,6-diaminotoluene,
 3,4-diaminotoluene,
 3,5-diaminotoluene,
 diaminoxylene,
 o-phenylenediamine,
 p-phenylenediamine.

The alkylene oxide used in accordance with the invention may be any of the $C_2$ to $C_{15}$ alkylene oxides. Preferably a lower alkylene oxide is used, such as ethylene oxide or propylene oxide. The term "alkylene oxide" should be considered as also covering in some instances the use of other similar epoxy compounds, such as epichlorohydrin. Moreover, in the instances in which a relatively longer-chain alkylene oxide is used, such as a mixture of $C_{11}$ to $C_{14}$ alkylene oxides sold by Ashland Oil and Refining Company under the trademark NEEDOX, it will be possible to use relatively fewer mols of the alkylene oxide compound per mol of MDA or similar amine, thereby obtaining substantially the same reaction-retarding effect.

EXAMPLES 4-6 and Comparison Tests A & B

Using recipes as indicated in Table I below, cellular polyurethane compositions containing a novel curing agent made in accordance with the present invention were prepared, in accordance with the one-shot procedure familiar to those skilled in the art. The one-shot procedure involved mixing (1) all of the ingredients of the polyurethene composition except for the polyisocyanate component or ingredient and (2) the polyisocyanate-containing ingredient, and then molding or otherwise suitably containing the cellular foam material thus produced. Table I also presents the results of comparison tests wherein technical-grade MOCA in one case and MDA in another case are used as cross-linking agents.

TABLE I

| Example or Test | 4 | 5 | 6 | A | B |
|---|---|---|---|---|---|
| | | | Parts by Weight | | |
| Polyol[a] | 97 | 95 | 93 | 95 | 95 |
| Curing Agent[b] | 3 | 5 | 7 | 0 | 0 |
| MOCA[c] | 0 | 0 | 0 | 5 | 0 |
| MDA | 0 | 0 | 0 | 0 | 5 |
| Water | 2.5 | 2.5 | 2.5 | 2.5 | 2.5 |
| Catalyst[d] | 0.1 | 0.1 | 0.1 | 0.1 | 0.1 |
| NEM[e] | 1.0 | 1.0 | 1.0 | 1.0 | 1.0 |
| Surfactant[f] | 0.01 | 0.01 | 0.01 | 0.01 | 0.01 |
| Catalyst[g] | 0.03 | 0.03 | 0.03 | 0.03 | 0.03 |
| Polyisocyanate[h] | 39.2 | 41.7 | 44.2 | 38.8 | 40.7 |
| Rise time, seconds | 190 | 160 | 140 | 170 | i |

[a]Glycerine-based polyoxypropylene polyol capped with polyoxyethylene groups and having a hydroxyl number of 35.
[b]Material prepared according to Example 3, above.
[c]Technical-grade methylene-bis-(o-chloroaniline)
[d]Bicyclic triethylene diamine catalyst, such as that sold by Air Products and Chemicals, Inc., Wayne, Pa., under the name "DABCO".
[e]N-ethyl morpholine
[f]Silicone (polysiloxane) surfactant such as that sold by Dow-Corning Corp. under the name "DC-200".
[g]Dibutyl tin dilaurate.
[h]Undistilled tolylene diisocyanate prepared by phosgenation of isomeric mixture of tolylene diamines.

[i]Collapsed within 60 seconds.

In the tests indicated in the foregoing table, it was attempted in each case to prepare a cellular polyurethane composition having an index of 105, i.e., a stoichiometric 5 percent excess of isocyanate groups over active hydrogen atoms. Those skilled in the art will appreciate that it is usual to have an index value on the order of 90 to 110. Other things being equal, a composition with a higher index value will be of somewhat greater firmness than one with a lower index value.

The materials prepared in Examples 4, 5, and 6 were quite similar to the material prepared in Comparison Test A, using MOCA as in accordance with the prior art.

Comparison Test B illustrates again the unworkability of MDA.

The data show, moreover, that the rise time decreases as the proportion of the inventive curing agent that is used is increased.

Those skilled in the art will understand that a cellular polyurethane composition can be made more "open" or, on the contrary, more "tight", by using relatively less or more, respectively, of the curing agent, and that in the case of compositions that are relatively tight, it is usually necessary or desirable to perform, almost immediately after a formation of the foam, a crushing of the foam composition, for example, by passing it between rollers to cause the individual cells or bubbles of the foam to rupture. This prevents or minimizes an unwanted shrinking of the flexible foam composition during subsequent handling or processing. It is usual to post-cure a flexible polyurethane foam composition by baking it in an oven at 200° to 300°F. for 15 minutes to 3 hours, after it is formed.

While the present invention is chiefly of interest in connection with the making of flexible polyurethane foam compositions, curing agents in accordance with the present invention may, of course, be used in the manufacture of semirigid or rigid polyurethane compositions, if desired.

The curing agents made in accordance with this invention will seldom, if ever, be pure chemical compounds. Ordinarily, it will be desirable and least costly to proceed by reacting a starting diamine with the alkylene oxide, permitting the reaction to proceed under conditions such that there is obtained as a result a mixture of mono-, di-, tri-, and tetra-alkoxylated amines. Of course, the relative proportions of the product mixture that belong to different ones of the four categories can be influenced importantly by the selection of the ratio of alkylene oxide to starting aromatic diamine. If a relatively greater proportion of alkylene oxide is used, there will be generated more of the tri- and tetra-alkoxylated amine and relatively less of the di- and mono-alkoxylated amine.

While the present invention is, of course, capable of being practiced with aromatic diamines or, for that matter, higher aromatic amines of any suitable sort, the invention will in general be practiced with the use of an aromatic diamine that (1) is of modest price, (2) does not have an aromatic moiety that is known to be a carcinogen or is suspected of being one, and (3) has some relatively unhindered and reactive amino hydrogen atoms, such that it would be desirable to alkoxylate such aromatic diamine and thereby diminish its reactivity so as to render it more suitable for use as a cross-linking agent for the making of polyurethane compositions in place of such known cross-linking agents as methylene bis-(orthochloro aniline), i.e., MOCA. Those skilled in the art will appreciate from the foregoing statement that the starting diamine will, therefore, in most cases, be methylene dianiline (MDA), though the use of other aromatic amines is certainly not to be ruled out, particularly when the starting amine is one that meets most or all of the three particular criteria mentioned above, as methylene dianiline does.

While I have shown and described herein certain embodiments of my invention, I intend to cover as well any change or modification therein that may be made without departing from its spirit and scope.

The embodiments of the invention in which an exclusive property or privilege is claimed are defined as follows:

1. A reaction product of methylene dianiline with 0.7 to 2.5 times as many moles of an alkylene oxide selected from the group consisting of ethylene oxide and propylene oxide.

2. A composition as defined in claim 1, said composition being a reaction product of methylene dianiline with about 1 to 2 times as many mols of propylene oxide.

3. In the making of a polyurethane composition, the improvement comprising the use as a curing agent of a reaction product of methylene dianiline with 0.7 to 2.5 times as many moles of an alkylene oxide selected from the group consisting of ethylene oxide and propylene oxide.

4. An improvement as defined in claim 3, wherein said curing agent is a reaction product of methylene dianiline with about 1 to 2 times as many mols of propylene oxide.

* * * * *